(12) United States Patent
Lee et al.

(10) Patent No.: US 10,564,604 B2
(45) Date of Patent: Feb. 18, 2020

(54) APPARATUS FOR MANUFACTURING HOLOGRAPHIC OPTICAL ELEMENT, AND APPARATUS FOR RECONSTRUCTING HOLOGRAMS

(71) Applicant: SEOUL NATIONAL UNIVERSITY R&DB FOUNDATION, Seoul (KR)

(72) Inventors: Byoungho Lee, Seoul (KR); Youngmo Jeong, Seoul (KR); Gang Li, Seoul (KR); Dukho Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 188 days.

(21) Appl. No.: 15/807,199

(22) Filed: Nov. 8, 2017

(65) Prior Publication Data

US 2018/0129165 A1 May 10, 2018

(30) Foreign Application Priority Data

Nov. 8, 2016 (KR) .................. 10-2016-0148185

(51) Int. Cl.
*G03H 1/12* (2006.01)
*G03H 1/22* (2006.01)
*G03H 1/04* (2006.01)

(52) U.S. Cl.
CPC ......... *G03H 1/2205* (2013.01); *G03H 1/0406* (2013.01); *G03H 1/0443* (2013.01);
(Continued)

(58) Field of Classification Search
CPC .......... G02B 5/32; G03H 1/00; G03H 1/0005; G03H 1/02; G03H 2001/0216;
(Continued)

(56) References Cited

U.S. PATENT DOCUMENTS 4,001,874 A * 1/1977 Lacotte ............... H04N 5/7605
348/41
4,054,356 A * 10/1977 Noguchi ................. G02B 5/32
359/19

(Continued)

FOREIGN PATENT DOCUMENTS

JP 2005-189748 7/2005
JP 2005322382 A 11/2005

(Continued)

OTHER PUBLICATIONS

Office Action for Korean Appln. No. 10-2016-0148185 dated Nov. 6, 2017, 6 pages.
Office Action for Korean application No. 1020160148185 dated Jun. 8, 2018, 5 pages.

*Primary Examiner* — Arnel C Lavarias
(74) *Attorney, Agent, or Firm* — Kilpatrick Townsend & Stockton LLP

(57) ABSTRACT

An apparatus for manufacturing a hologram includes a holographic optical element on which a first interference pattern of a first signal beam and a first reference beam is recorded and a second interference pattern of a second signal beam modulated by a Fourier lens and a second reference beam is recorded. Also, an apparatus for reconstructing a hologram by using the holographic optical element is provided.

4 Claims, 11 Drawing Sheets

(52) U.S. Cl.
CPC ..... *G03H 1/2294* (2013.01); *G03H 2001/045* (2013.01); *G03H 2001/0413* (2013.01); *G03H 2001/0439* (2013.01); *G03H 2222/33* (2013.01)

(58) Field of Classification Search
CPC ................ G03H 1/024; G03H 1/0248; G03H 2001/0264; G03H 2001/026; G03H 1/04; G03H 1/0402; G03H 1/0406; G03H 1/041; G03H 2001/0413; G03H 2001/0415; G03H 2001/0419; G03H 2001/0428; G03H 2001/0439; G03H 2001/0441; G03H 1/0465; G03H 2001/0473; G03H 1/28
USPC ...... 359/1, 3, 10, 11, 15, 19, 22, 24, 28, 29, 359/30, 31, 32, 35; 430/1, 2
See application file for complete search history.

(56) References Cited

U.S. PATENT DOCUMENTS

| | | | |
|---|---|---|---|
| 4,998,787 A * | 3/1991 | Caputi | G02B 5/32 359/20 |
| 5,216,527 A * | 6/1993 | Sharnoff | G01B 9/025 356/457 |
| 7,633,660 B2 | 12/2009 | Toishi | |
| 9,291,997 B2 | 3/2016 | Pyun et al. | |
| 2006/0198275 A1 | 9/2006 | Kogure | |
| 2007/0183009 A1 | 8/2007 | Tsukagoshi et al. | |

FOREIGN PATENT DOCUMENTS

| | | |
|---|---|---|
| JP | 2006-244638 | 9/2006 |
| JP | 2008040166 A | 2/2008 |
| KR | 10-2013-0129057 | 11/2013 |

* cited by examiner

WHEN FIRST INTERFERENCE
PATTERN IS RECORDED

WHEN FIRST RECONSTRUCTION
BEAM IS RECONSTRUCTED

WHEN SECOND INTERFERENCE
PATTERN IS RECORDED

WHEN SECOND RECONSTRUCTION
BEAM IS RECONSTRUCTED (a)

(b)

(c)

APPARATUS FOR MANUFACTURING HOLOGRAPHIC OPTICAL ELEMENT, AND APPARATUS FOR RECONSTRUCTING HOLOGRAMS

CROSS-REFERENCE TO RELATED APPLICATION

This application claims the benefit of Korean Patent Application No. 10-2016-0148185, filed on Nov. 8, 2016, in the Korean Intellectual Property Office, the disclosure of which is incorporated herein in its entirety by reference.

BACKGROUND

1. Field

One or more embodiments relate to an apparatus for manufacturing a holographic optical element, and an apparatus for reconstructing a holographic image by using the holographic optical element.

2. Description of the Related Art

Recently, there has been a great demand for a three-dimensional image display device capable of realistically and effectively realizing images in various fields such as movies, games, advertisements, medical imaging, education, military, etc. Accordingly, various techniques for displaying a three-dimensional image have been proposed, and various three-dimensional image display devices have already been commercialized.

Three-dimensional image display devices include, for example, a glasses type and a non-glasses type. Furthermore, the glasses type includes a polarized glasses type and a shutter glasses type. The non-glasses type includes a stereoscopy type which includes a lenticular type using a plurality of cylindrical lens arrays and a parallax barrier type having a plurality of barriers and openings.

A hologram method and an integral imaging method have been proposed as a three-dimensional image display method in which depth perception recognized by the brain matches the focal point of the eyes and which can provide full parallax.

A hologram, which is a medium on which a light wave is recorded, stores intensity and phase information of the light wave. While ordinary photographs only record intensity information, holograms store both intensity and phase, thus enabling three-dimensional reconstruction of visual information. For recording a hologram, two beams including a signal beam and a reference beam, both having coherence, are required. The signal beam is a beam that can be modulated from an object to be recorded. The intensity or phase information of an interference pattern between the signal beam and the reference beam is recorded in a hologram recording medium, and thus the intensity or phase information of a modulated signal beam can be recorded. When a beam having the same optical characteristics as the reference beam used for recording is incident on the recorded hologram, the signal beam stored in the hologram can be reproduced.

SUMMARY

One or more embodiments include a apparatus for manufacturing a holographic optical element, and apparatus for reconstructing a holographic image by using the holographic optical element Additional aspects will be set forth in part in the description which follows and, in part, will be apparent from the description, or may be learned by practice of the presented embodiments.

According to one or more embodiments, an apparatus for manufacturing a holographic optical element having different optical characteristics includes: a light emitting portion configured to sequentially emit a first laser beam and a second laser beam; a beam splitter configured to split the first laser beam into a first signal beam and a first reference beam, and split the second laser beam into a second signal beam and a second reference beam; a hologram recording medium; a first optical system configured to emit the first signal beam to one surface of the hologram recording medium and the first reference beam to another surface of the hologram recording medium, and to record a first interference pattern of the first signal beam and the first reference beam on the hologram recording medium; and a second optical system comprising a Fourier lens and configured to emit a second signal beam modulated by the Fourier lens to one surface of the hologram recording medium and a second reference beam to another surface of the hologram recording medium, and to record a second interference pattern of the modulated second signal beam and the second reference beam on the hologram recording medium.

Energy of the modulated second signal beam and the second reference beam emitted to the hologram recording medium during recording of the second interference pattern may be set to be greater than energy of the first signal beam and the first reference beam emitted to the hologram recording medium during recording of the first interference pattern.

The light emitting portion may emit the second laser beam longer than an emission time of the first laser beam.

The hologram recording medium, on which the first interference pattern and the second interference pattern are recorded, may have optical characteristics of a mirror corresponding to the first interference pattern and optical characteristics of a Fourier lens corresponding to the second interference pattern.

According to one or more embodiments, an apparatus for reconstructing a hologram includes: a holographic optical element on which a first interference pattern of a first signal beam and a first reference beam is recorded and a second interference pattern of a second signal beam modulated by a Fourier lens and a second reference beam is recorded; a spatial light modulator; and a light source configured to emit a first standard beam to the holographic optical element, corresponding to the first reference beam, wherein the holographic optical element, in response to the first standard beam, reconstructs a first reconstruction beam corresponding to the first signal beam, and emits the first reconstruction beam to the spatial light modulator, the spatial light modulator generates a second standard beam by modulating the first reconstruction beam according to hologram information, and emits the second standard beam to the holographic optical element, corresponding to the second reference beam, and the holographic optical element reconstructs a holographic image by focusing the second standard beam in a space.

Energy of the modulated second signal beam and the second reference beam emitted during recording of the second interference pattern may be set to be greater than energy of the first signal beam and the first reference beam emitted during recording of the first interference pattern.

The first standard beam and the second standard beam may satisfy a Bragg's matching condition with the first reference beam and the second reference beam, respectively.

The hologram information may be information about a computer-generated hologram.

The second standard beam may indicate a Fourier-transformed computer-generated hologram, and the holographic optical element may perform an inverse Fourier transform on the Fourier-transformed computer-generated hologram to generate the holographic image.

The spatial light modulator may generate the second standard beam by modulating the first reconstruction beam according to hologram information considering an angular difference between the spatial light modulator and the holographic optical element.

The apparatus may further include: a plurality of polarized panels arranged in front of and in the rear of the spatial light modulator in a perpendicular direction with each other; and a half bandpass filter.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
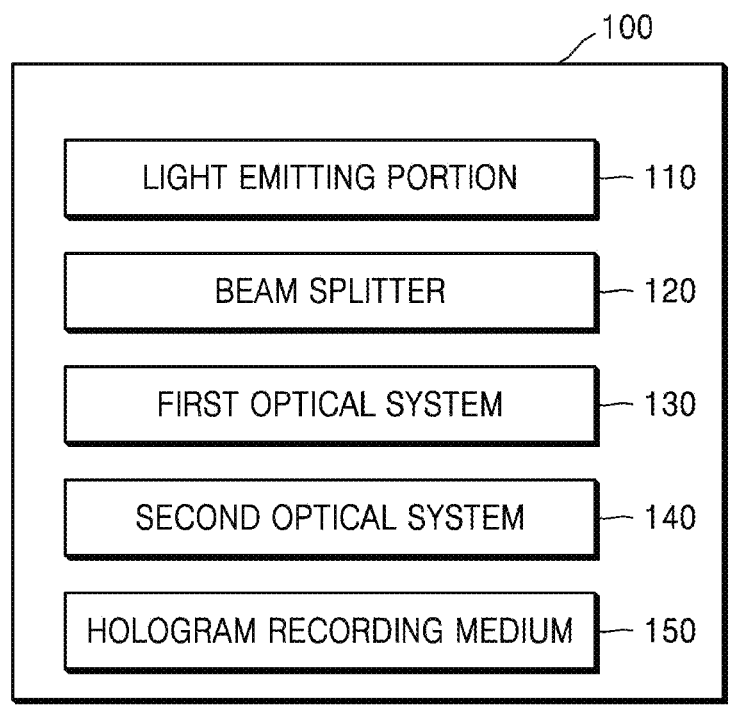
FIG. 1 is a block diagram of an apparatus for manufacturing a holographic optical element according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The terms used in the present inventive concept have been selected from currently widely used general terms in consideration of the functions in the present inventive concept. However, the terms may vary according to the intention of one of ordinary skill in the art, case precedents, and the advent of new technologies. Also, for special cases, meanings of the terms selected by the applicant are described in detail in the description section. Accordingly, the terms used in the present inventive concept are defined based on their meanings in relation to the contents discussed throughout the specification, not by their simple meanings.

When a part may "include" a certain constituent element, unless specified otherwise, it may not be construed to exclude another constituent element but may be construed to further include other constituent elements.

The present inventive concept will now be described more fully with reference to the accompanying drawings, in which embodiments of the inventive concept are shown. Throughout the drawings, like reference numerals denote like elements. In the following description, when detailed descriptions about related well-known functions or structures are determined to make the gist of the present inventive concept unclear, the detailed descriptions will be omitted herein.

FIG. 1 is a block diagram of an apparatus 100 for manufacturing a holographic optical element according to an embodiment.

Referring to FIG. 1, the apparatus 100 for manufacturing a holographic optical element may include a light emitting portion 110, a beam splitter 120, a hologram recording medium 150, a first optical system 130, and a second optical system 140. In FIG. 1, only constituent elements related to the apparatus 100 according to the present embodiment are illustrated. Accordingly, a person having ordinary skill in the art may understand that, in addition to the constituent elements illustrated in FIG. 1, the apparatus 100 can further include other common constituent elements.

The light emitting portion 110 according to the present embodiment may sequentially emit a first laser beam and a second laser beam. In other words, the light emitting portion 110 may emit the first laser beam for a certain time and then the second laser beam for a certain time.

The beam splitter 120 according to the present embodiment may split a first laser beam emitted from the light emitting portion 110 into a first signal beam and a first reference beam. Furthermore, the beam splitter 120 according to the present embodiment may split the second laser beam emitted from the light emitting portion 110 into a second signal beam and a second reference beam. According to the present embodiment, the beam splitter 120 may be a half mirror, by which about 50% of an incident beam is transmitted to be used as a reference beam and about 50% of the incident beam is reflected to be used as a signal beam.

The first optical system 130a allows the first signal beam to be incident on one surface of the hologram recording medium 150, and the first reference beam to be incident on the other surface of the hologram recording medium, and thus a first interference pattern of the first signal beam and the first reference beam maybe be recorded on the hologram recording medium 150. A detailed example thereof is described below with reference to FIG. 2.

The second optical system 140 may include a Fourier lens, which allows the second signal beam modulated by the Fourier lens to be incident on one surface of the hologram recording medium 150 and the second reference beam to be incident on the other surface of the hologram recording medium 150. Thus, a second interference pattern of the modulated second signal beam and the second reference beam may be recorded on the hologram recording medium 150. A detailed embodiment thereof is described below with reference to FIG. 3.

The hologram recording medium 150 may include, for example, silver halide, photorefractive polymer, photopolymer, etc.

Accordingly, the apparatus 100 may manufacture a holographic optical element by recording the first interference pattern and the second interference pattern on the hologram recording medium 150. The holographic optical element manufactured by the apparatus 100 may have different optical characteristics, in particular, the optical characteristics according to the first interference pattern and simultaneously the optical characteristics according to the second interference pattern. For example, the holographic optical element may have the optical characteristics of a "mirror" according to the first interference pattern, and simultaneously have the optical characteristics of a "Fourier lens" according to the second interference pattern.

Figure 2:
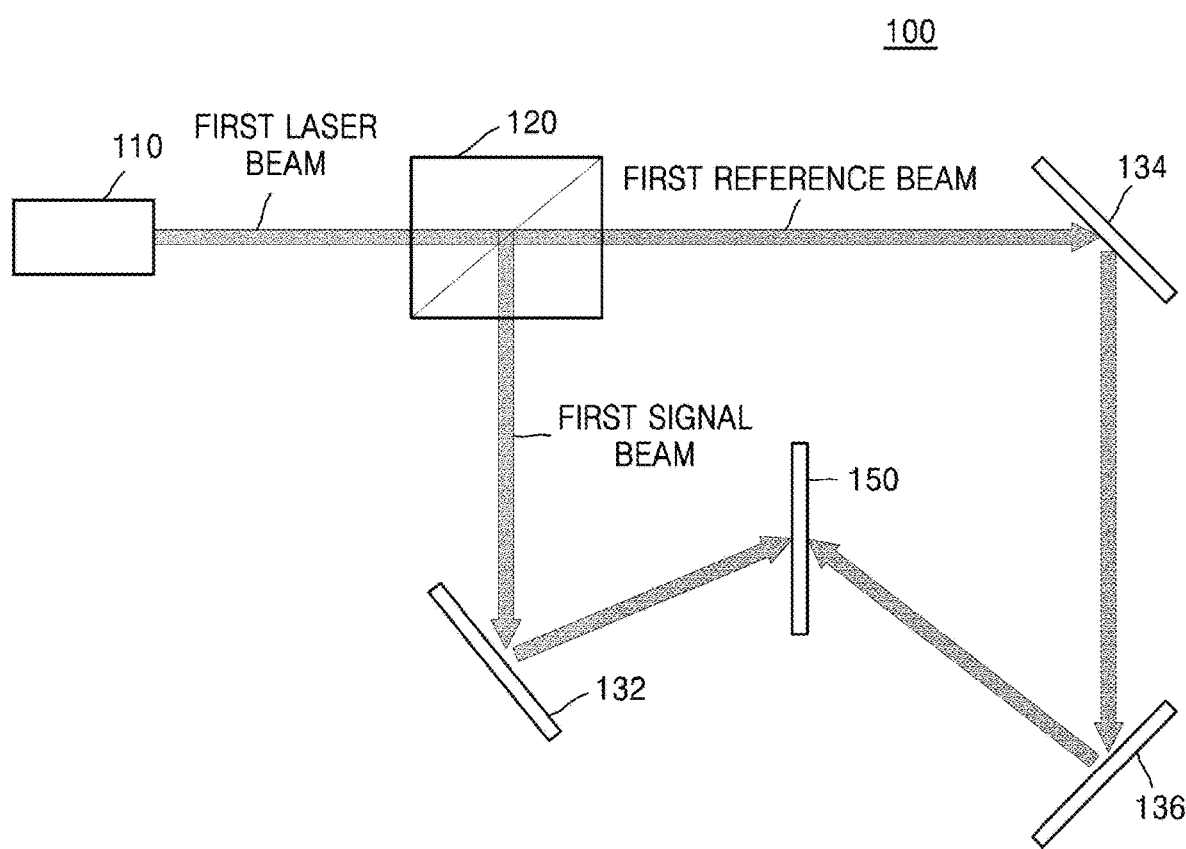
FIG. 2 schematically illustrates that the apparatus of FIG. 1 records a first record pattern of a first signal beam and a first reference beam on a hologram recording medium through a first optical system.

FIG. 2 schematically illustrates that the apparatus 100 of FIG. 1 records the first record pattern of the first signal beam and the first reference beam on the hologram recording medium 150 through the first optical system 130.

According to the present embodiment, the first optical system 130 may include a first mirror 132, a second mirror 134, and a third mirror 136.

The light emitting portion 110 may emit the first laser beam, and the beam splitter 120 may split the first laser beam into the first reference beam and the first signal beam. However, although FIG. 2 illustrates that a light passing through the beam splitter 120 is the first reference beam and a light reflected from the beam splitter 120 is the first signal beam, this is merely exemplary. For example, in another embodiment, the optical arrangement of the apparatus 10 may be changed such that the light passing through the beam splitter 120 is the first signal beam, and the light reflected from the beam splitter 120 is the first reference beam.

Next, the first mirror 132 of the first optical system 130 may reflect the first signal beam split from the beam splitter 120 to be incident on one surface of the hologram recording medium 150. Furthermore, the second mirror 134 and the third mirror 136 of the first optical system 130 may reflect the first reference beam split from the beam splitter 120 to be incident on the other surface of the hologram recording medium 150.

The first optical system 130 may further include an aperture (not shown) to adjust an area of the first signal beam and the first reference beam emitted to the hologram recording medium 150.

Accordingly, the first interference pattern may be formed as the first reference beam and the first signal beam meet each other. The first interference pattern formed as above may be recorded on the hologram recording medium 150.

Furthermore, the first mirror 132, the second mirror 134, and the third mirror 136 of the first optical system 130 may adjust angles at which the first signal beam and the first reference beam are emitted to the hologram recording medium 150.

Figure 3:
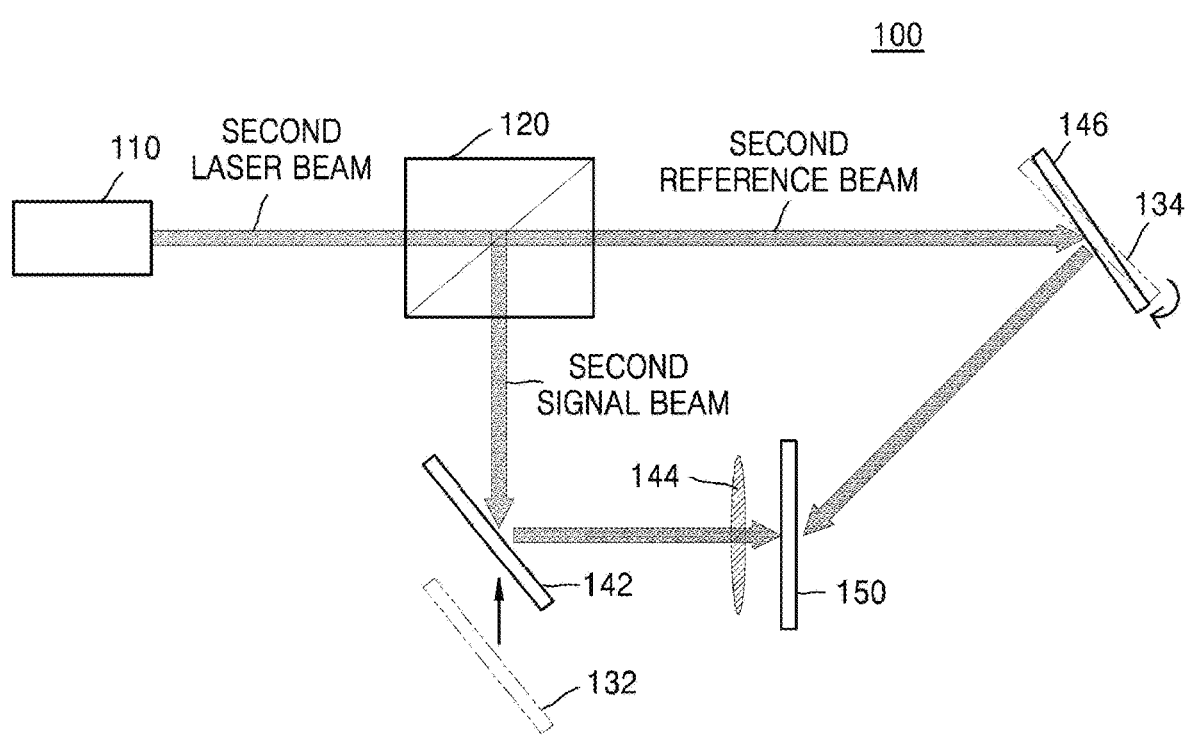
FIG. 3 schematically illustrates that the apparatus of FIG. 1 records a second record pattern of a second signal beam modulated by a Fourier lens and a second reference beam on a hologram recording medium through a second optical system.

FIG. 3 schematically illustrates that the apparatus 100 of FIG. 1 records the second record pattern of the second signal beam modulated by a Fourier lens 144 and the second reference beam on the hologram recording medium 150 through the second optical system 140.

According to the present embodiment, the second optical system 140 may include a first mirror 142, the Fourier lens 144, and a second mirror 146. According to the present embodiment, the first mirror 142 may be in a form of moving the first mirror 132 of FIG. 2, and the second mirror 146 may be in a form of rotating the second mirror 134 of FIG. 2. For example, the second optical system 140 may further include a stage (not shown) that is motorized to be moved, and the first mirror 132 and the second mirror 134 of FIG. 2 may be moved or rotated by means of the stage.

The light emitting portion 110 may emit the second laser beam, and the beam splitter 120 may split the second laser beam into the second reference beam and the second signal beam. However, although FIG. 3 illustrates that the light passing through the beam splitter 120 is the second reference beam and the light reflected from the beam splitter 120 is the second signal beam, this is merely exemplary. For example, in another embodiment, the optical arrangement of the apparatus 100 may be changed such that the light passing through the beam splitter 120 is the second signal beam and the light reflected from the beam splitter 120 is the second reference beam.

Next, the first mirror 142 of the second optical system 140 may reflect the second signal beam split by the beam splitter 120 to be perpendicularly incident on the Fourier lens 144. Accordingly, the second signal beam reflected from the first mirror 142 may be modulated while passing through the Fourier lens 144, and the modulated second signal beam may be incident on one surface of the hologram recording medium 150. Furthermore, the second mirror 146 of the second optical system 140 may reflect the second reference beam split by the beam splitter 120 to be incident on the other surface of the hologram recording medium 150 at a preset angle. Furthermore, the apparatus 100 may adjust the preset angle by beams of the second mirror 146.

The Fourier lens 144 may have a characteristic to perform a Fourier transform or an inverse Fourier transform on an incident beam with respect to a spatial frequency according to an embodiment.

The second optical system 140 may further include an aperture (not shown) to adjust an area of the second signal beam and the second reference beam emitted to the hologram recording medium 150.

Accordingly, the second interference pattern may be formed as the second reference beam and the second signal beam meet each other through the Fourier lens 144. The second interference pattern formed as above may be recorded on the hologram recording medium 150.

Figure 4:
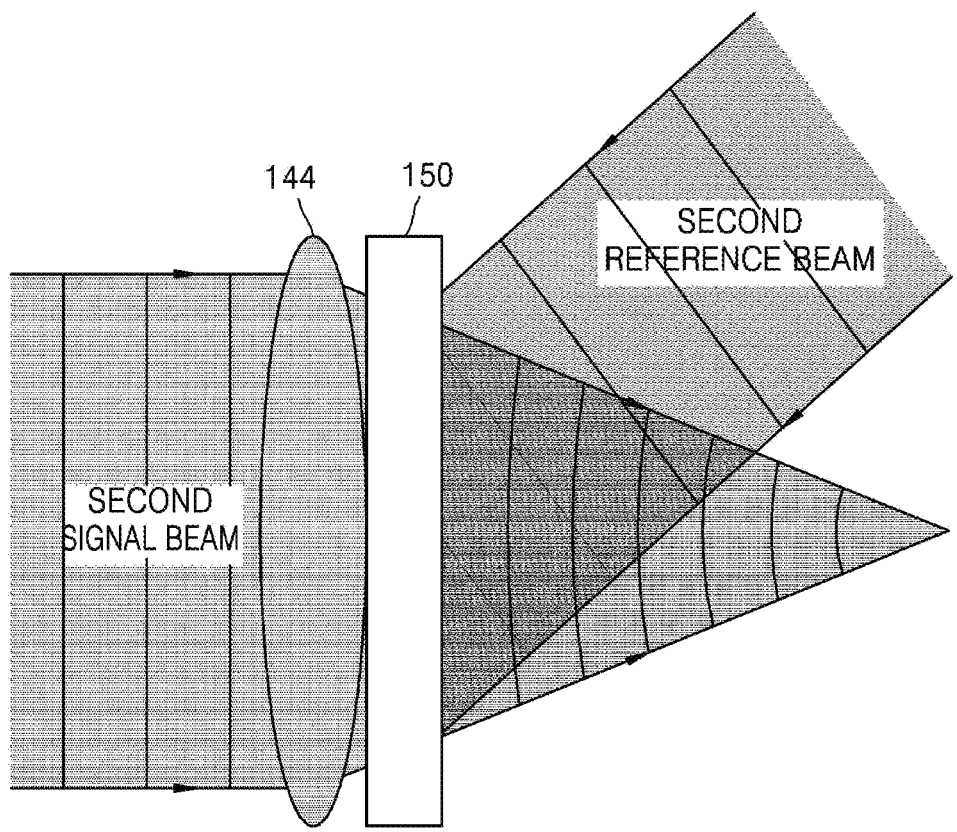
FIG. 4 illustrates in detail a process of recording an interference pattern of a second reference beam and a second signal beam modulated by a Fourier lens on a hologram recording medium, according to an embodiment.

FIG. 4 illustrates in detail a process of recording the interference pattern of the second reference beam and the second signal beam modulated by the Fourier lens 144 on the hologram recording medium 150, according to an embodiment.

As illustrated in FIG. 4, the second reference beam, as a plane-wave, is emitted to the hologram recording medium 150. Furthermore, the second signal beam of a plane-wave passes through the Fourier lens 144 to be modulated into a spherical-wave having the optical characteristics of the Fourier lens 144, and is emitted to the hologram recording medium 150. The second reference beam and the modulated second signal beam meet each other forming an interference pattern, and the formed interference pattern is recorded on the hologram recording medium 150. The hologram recording medium 150 where the interference pattern is recorded may denote a holographic optical element.

The apparatus 100 may record the first interference pattern of the first reference beam and the first signal beam on the hologram recording medium 150, through the embodiment of FIG. 2, and then the second interference pattern of the second reference beam and the second signal beam modulated by the Fourier lens 144 on the hologram recording medium 150, through the embodiment of FIG. 3. According to an embodiment, the apparatus 100 may set the energy of the modulated second signal beam and the second reference beam emitted to the hologram recording medium 150 for the recording of the second interference pattern, to be greater than the energy of the first signal beam and the first reference beam emitted to the hologram recording medium 150 for the recording of the first interference pattern. For example, when the laser beam emitted from the light emitting portion 110 has the same energy quantity per hour, the light emitting portion 110 emits the second laser beam longer than an emission time of the first laser beam, and thus the energy of the modulated second signal beam and the second reference beam for the recording of the second interference pattern may be set to be greater than the energy of the first signal beam and the first reference beam for the recording of the first interference pattern. According to an embodiment, to equate diffraction efficiency of the holographic optical element with respect to the optical characteristics of the first interference pattern and diffraction efficiency of the holographic optical element with respect to the optical characteristics of the second interference pattern, the apparatus 100 may set the energy of the modulated second signal beam and the second reference beam for the recording of the second interference pattern to be greater than the energy of the first signal beam and the first reference beam for the recording of the first interference pattern.

Furthermore, although FIGS. 2 and 3 illustrate that the apparatus 100 uses a reflection hologram recording method in which the signal beam and the reference beam are respectively incident on both surfaces of the hologram recording medium 150, according to another embodiment, the apparatus 100 may adopt a transmission hologram recording method in which the signal beam and the reference beam are incident on one surface of the hologram recording medium 150.

Figure 5:
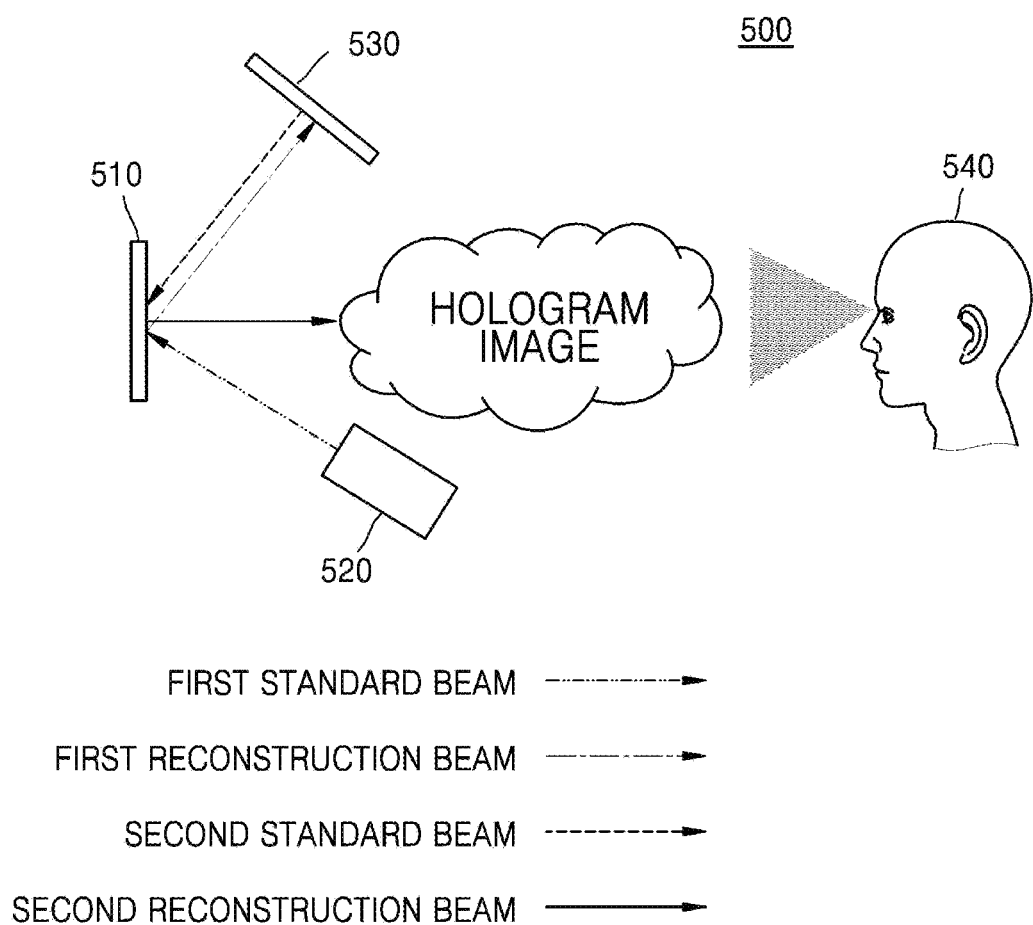
FIG. 5 schematically illustrates an apparatus for reconstructing a hologram, according to an embodiment.

FIG. 5 schematically illustrates an apparatus 500 for reconstructing a hologram, according to an embodiment.

The apparatus 500 for reconstructing a hologram according to the present embodiment may include a holographic optical element 510, a light source 520, and a spatial light modulator 530. In FIG. 5, only constituent elements related to the apparatus 500 for reconstructing a hologram according to the present embodiment are illustrated. Accordingly, a person having ordinary skill in the art may understand that, in addition to the constituent elements illustrated in FIG. 5, the apparatus 500 can further include other common constituent elements.

The holographic optical element 510 may be a hologram recording medium on which the first interference pattern of the first signal beam and the first reference beam is recorded and the second interference pattern of the second signal beam modulated by the Fourier lens 144 and the second reference beam are recorded. According to an embodiment, the holographic optical element 510 may be a holographic optical element manufactured by the apparatus 100 of FIGS. 1 to 3.

The light source 520 may emit a first standard beam to the holographic optical element 510, according to an embodiment. In particular, the light source 520 may emit the first standard beam to the holographic optical element 510 corresponding to the first reference beam. In detail, since the first reference beam used in the process of recording the first interference pattern on the holographic optical element 510 is a collimated light, to satisfy the Bragg's matching condition, the light source 520 may project a collimated light toward the holographic optical element 510. Bragg's matching denotes that a hologram recorded by a reference beam and a signal beam having a specific angle therebetween is reconstructed strongly depending on the angel between the reference beam during recording and the beam during reconstruction. In other words, for example, since the reference beam is incident at an angel θ in the recording process of the holographic optical element 510, the light source 520 may project a collimated light toward the holographic optical element 510 at an angle θ.

The holographic optical element 510, in response to the first standard beam emitted from the light source 520, may reconstruct the first reconstruction beam corresponding to the first signal beam, and may emit the first reconstruction beam toward the spatial light modulator 530. In detail, the holographic optical element 510 may receive the first standard beam satisfying the Bragg's matching condition with the first reference beam used in the recording process of the first interference pattern. Accordingly, the holographic optical element 510 may reconstruct the first signal beam used in the recording process of the first interference pattern as the first reconstruction beam.

Figure 6A:
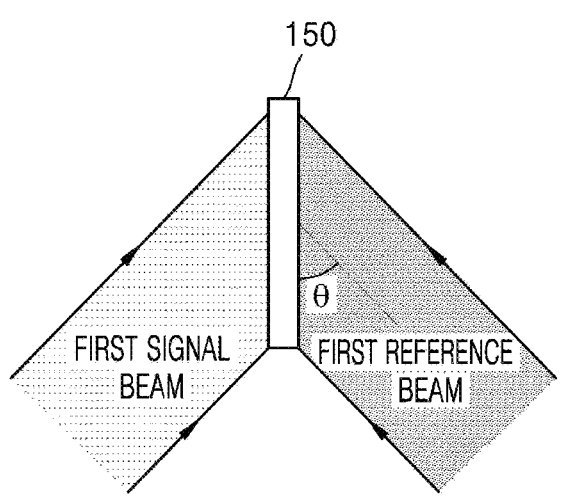
FIGS. 6A and 6B illustrate a detailed example in which the holographic optical element reconstructs a first reconstruction beam in response to the first standard beam.
Figure 6B:
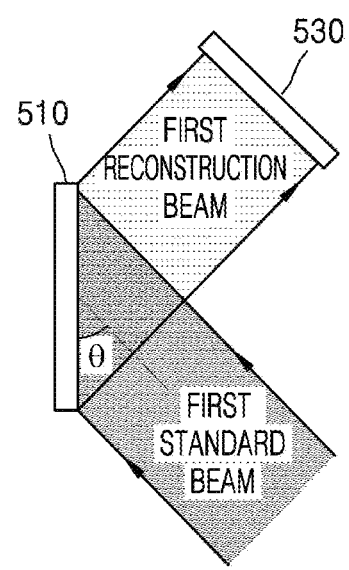

FIGS. 6A and 6B illustrate a detailed example in which the holographic optical element reconstructs a first reconstruction beam in response to the first standard beam.

Referring to FIG. 6A, during the manufacture of the holographic optical element 510, the first interference pattern by the first reference beam emitted at the angle θ with the first signal beam may be recorded on the hologram recording medium 150.

In FIG. 6B, when the first standard beam emitted from the light source 520 at the angle θ, the holographic optical element 510 may emit the first reconstruction beam toward the spatial light modulator 530 by reconstructing the first reconstruction beam corresponding to the first signal beam.

Referring back to FIG. 5, the spatial light modulator 530 may modulate the first reconstruction beam emitted from the holographic optical element 510 according to hologram information, thereby generating a second standard beam. In other words, the spatial light modulator 530 may generate the first reconstruction beam modulated according to the hologram information, as the second standard beam. In detail, the spatial light modulator 530 may transform the first reconstruction beam into the second standard beam that is an image formed of bright dots and dark dots, according to an electric signal including digital information. According to an embodiment, the hologram information may be information about a computer-generated hologram, and the spatial light modulator 530 may modulate the first reconstruction beam and thus generate the second standard beam that indicates a Fourier-transformed computer-generated hologram. According to an embodiment, the spatial light modulator 530 may be a reflective spatial light modulator, and may emit the generated second standard beam toward the holographic optical element 510. According to an embodiment, the spatial light modulator 530 may be an amplitude-type spatial light modulator.

Furthermore, according to an embodiment, as the second standard beam from the spatial light modulator 530 has oblique incidence with the holographic optical element 510, the second standard beam of the spatial light modulator 530 having a pixel size may appear to have a distorted pixel size on the holographic optical element 510. Accordingly, since a ratio of a horizontal length and a vertical length of the holographic image reconstructed according to the distortion phenomenon may vary, to correct the distortion phenomenon in advance, the spatial light modulator 530 may generate the second standard beam according to hologram information considering the angular difference between the holographic optical element 510 and the spatial light modulator 530. A detailed embodiment is presented below with reference to FIG. 9.

Furthermore, according to an embodiment, the apparatus 500 for reconstructing a hologram may further include a separate processor (not shown). The apparatus 500 for reconstructing a hologram may generate hologram information by using the processor, in particular, hologram information about Fourier-transformed computer-generated hologram.

The holographic optical element 510 may reconstruct the second reconstruction beam indicating a holographic image, in response to the second standard beam emitted from the spatial light modulator 530. In detail, the holographic optical element 510 may receive the second reference beam used in the process of recording the second interference pattern and the second standard beam satisfying the Bragg's matching condition, and may reconstruct the second reconstruction beam indicating a holographic image by focusing in a space the second standard beam according to the optical characteristics of the Fourier lens used when the recorded second interference pattern is recorded. In other words, the second standard beam indicates a Fourier-transformed computer-generated hologram. The holographic optical element 510 may perform an inverse Fourier transform on the second standard beam, according to the optical characteristics of the Fourier lens, and may reconstruct the second reconstruction beam indicating a holographic image.

Figure 7A:
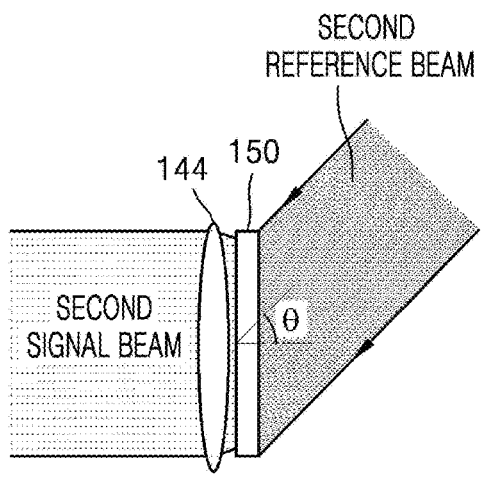
FIGS. 7A and 7B illustrate a detailed example in which the holographic optical element reconstructs a second reconstruction beam in response to the second standard beam.
Figure 7B:
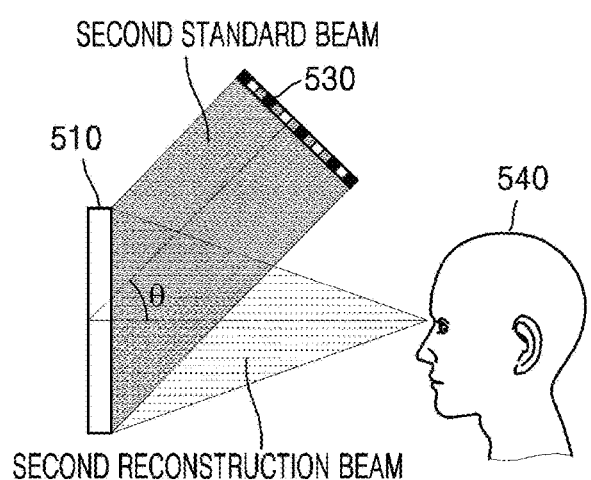

FIGS. 7A and 7B illustrate a detailed example in which the holographic optical element reconstructs a second reconstruction beam in response to the second standard beam;

Referring to FIG. 7A, during the manufacture of the holographic optical element 510, the second interference pattern by the second reference beam emitted at the angle θ with the second signal beam modulated by the Fourier lens 144 may be recorded on the hologram recording medium 150. Accordingly, the holographic optical element 510 may have the optical characteristics of the Fourier lens 144 with respect to the light satisfying the Bragg's matching condition.

In FIG. 7B, when the second standard beam emitted from the spatial light modulator 530 at the angle θ, the holographic optical element 510 may focus in a space the second standard beam according to the optical characteristics of the Fourier lens 144 and may reconstruct the second reconstruction beam indicating a three-dimensional hologram image.

Figure 8:
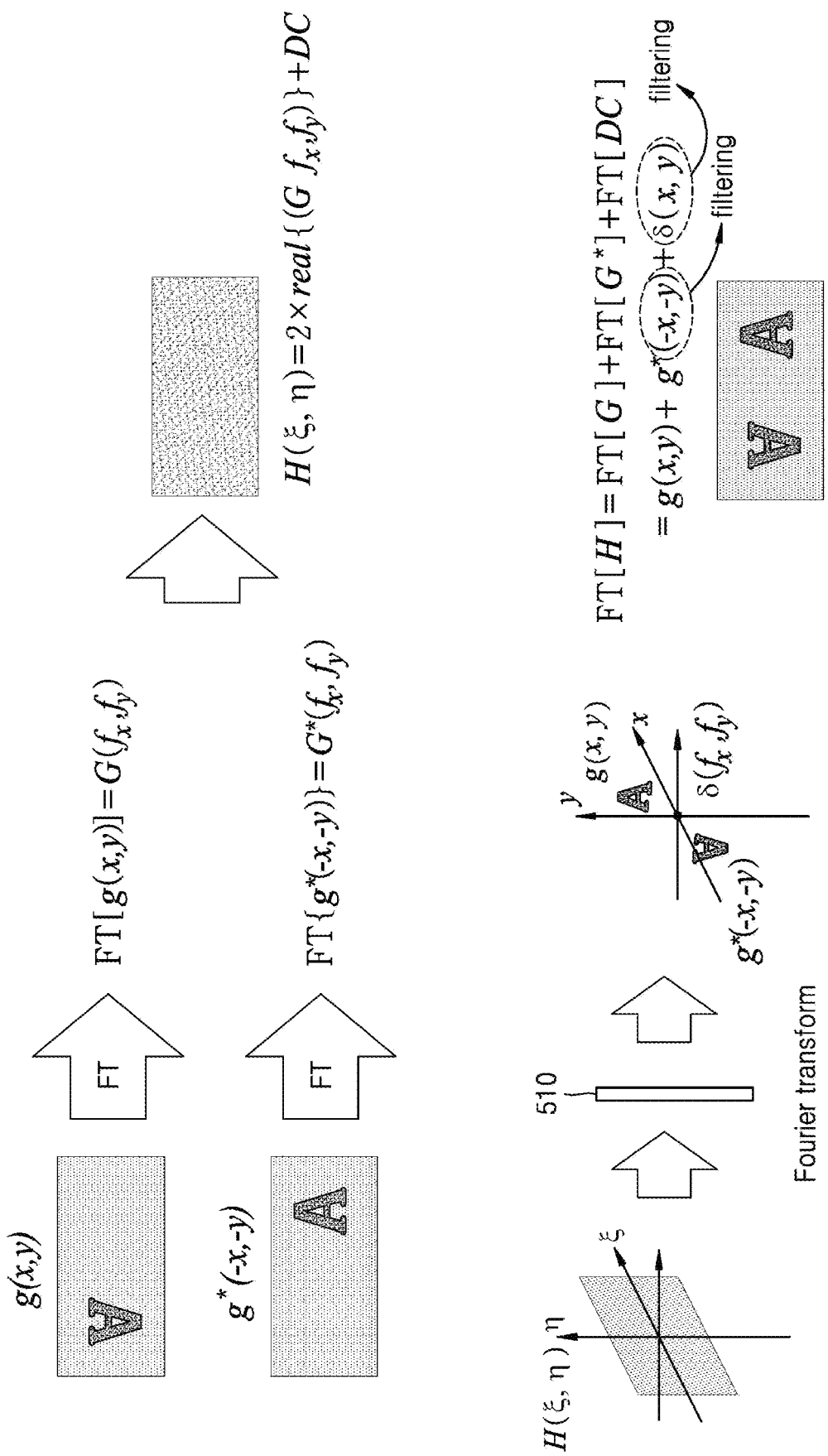
FIG. 8 illustrates an example in which a spatial light modulator generates a second standard beam according to hologram information, and an example in which the holographic optical element generates a second reconstruction beam by performing a Fourier transform on the second standard beam.

FIG. 8 illustrates an example in which the spatial light modulator 530 generates the second standard beam according to the hologram information, and an example in which the holographic optical element 510 generates the second reconstruction beam by performing a Fourier transform on the second standard beam.

Referring to FIG. 8, when the wave function of an object to be reconstructed as a hologram is "g(x,y)", the spatial light modulator 530 may modulate the first reconstruction beam according to the hologram information, and may generate the second standard beam indicating the Fourier-transformed computer-generated hologram that is "H(ξ,η)".

As illustrated in FIG. 8, not only a real term but also an imaginary term may be generated by a Fourier transform, and it is impossible to generate the imaginary term as the second standard beam, it may be seen that, instead of directly using "G($f_x,f_y$)", "H(ξ,η)" that is a sum with a conjugate term "G*($f_x,f_y$)" is used.

Next, the holographic optical element 510 may perform an inverse Fourier transform on the second standard beam indicating "H(ξ,η)" according to the optical characteristics of the Fourier lens 144, and thus the second reconstruction beam that is a holographic image with respect to "g(x,y)" may be reconstructed. As illustrated in FIG. 8, "g*(x,y)" and "δ(x,y)" may be generated as a result of the inverse Fourier transform of the holographic optical element 510. The apparatus 500 for reconstructing a hologram may further include a filtering portion (not shown), and thus "g*(x,y)" and "δ(x,y)" may be removed through filtering.

Figure 9:
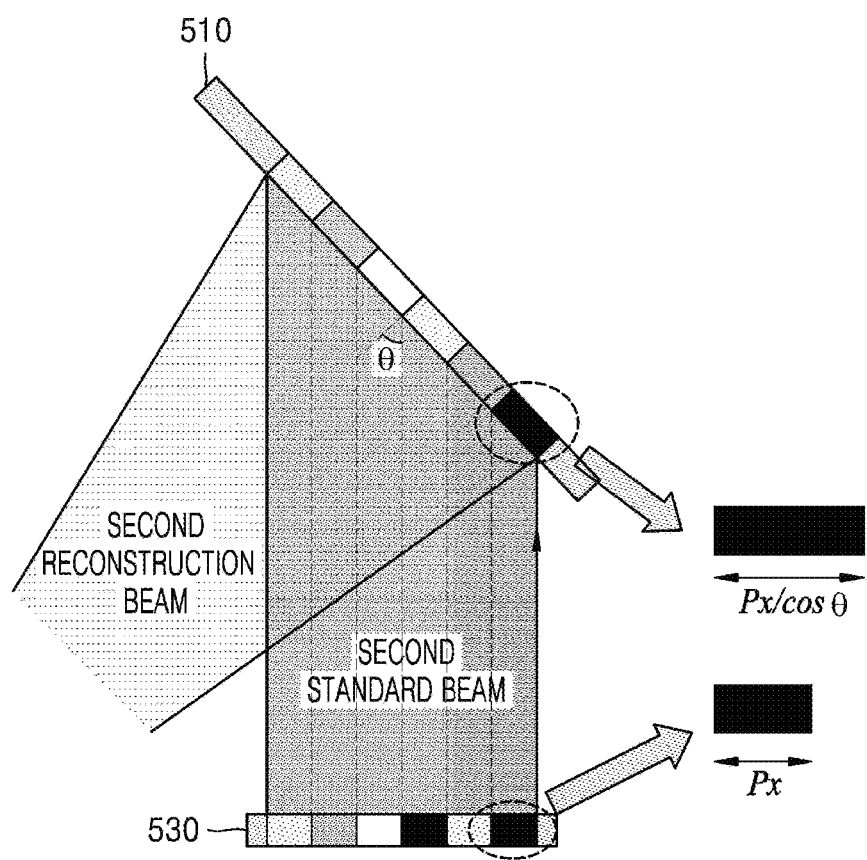
FIG. 9 illustrates a phenomenon that the size of a pixel is distorted according to the oblique incidence of the second standard beam.

FIG. 9 illustrates a phenomenon that the size of a pixel is distorted according to the oblique incidence of the second standard beam.

Referring to FIG. 9, when the second standard beam emitted from the spatial light modulator 530 is incident on the holographic optical element 510 at the angle θ, the second reference beam of the spatial light modulator 530 having a pixel size px may expand to a size of px/cos(θ) on the holographic optical element 510. Furthermore, since the size of a holographic image may be reduced as the pixel size increases, the size of an image may be distorted. Accordingly, to correct the distortion phenomenon in advance, the apparatus 500 for reconstructing a hologram may generate the second standard beam according to the hologram information considering the angle θ. For example, since the size of a holographic image may be reduced in a horizontal direction, the apparatus 500 for reconstructing a hologram may correct the distortion in advance in the process of generating a computer-generated hologram.

Referring back to FIG. 5, an observer 540 may see a holographic image reconstructed by the holographic optical element 510. Furthermore, the holographic optical element 510 having the characteristics of passing a light that does not satisfy the Bragg's matching condition among the lights incident on the holographic optical element 510, may have a see-through characteristic. Accordingly, the holographic optical element 510 may satisfy a see-through condition with no reduction of actual brightness that is an essential requirement in optical see-through augmented reality.

Accordingly, the apparatus 500 for reconstructing a hologram according to the present embodiment may be used for portable devices, head-up display devices, three-dimensional display devices, image screens, etc., which may implement the optical see-through augmented reality.

Figure 10:
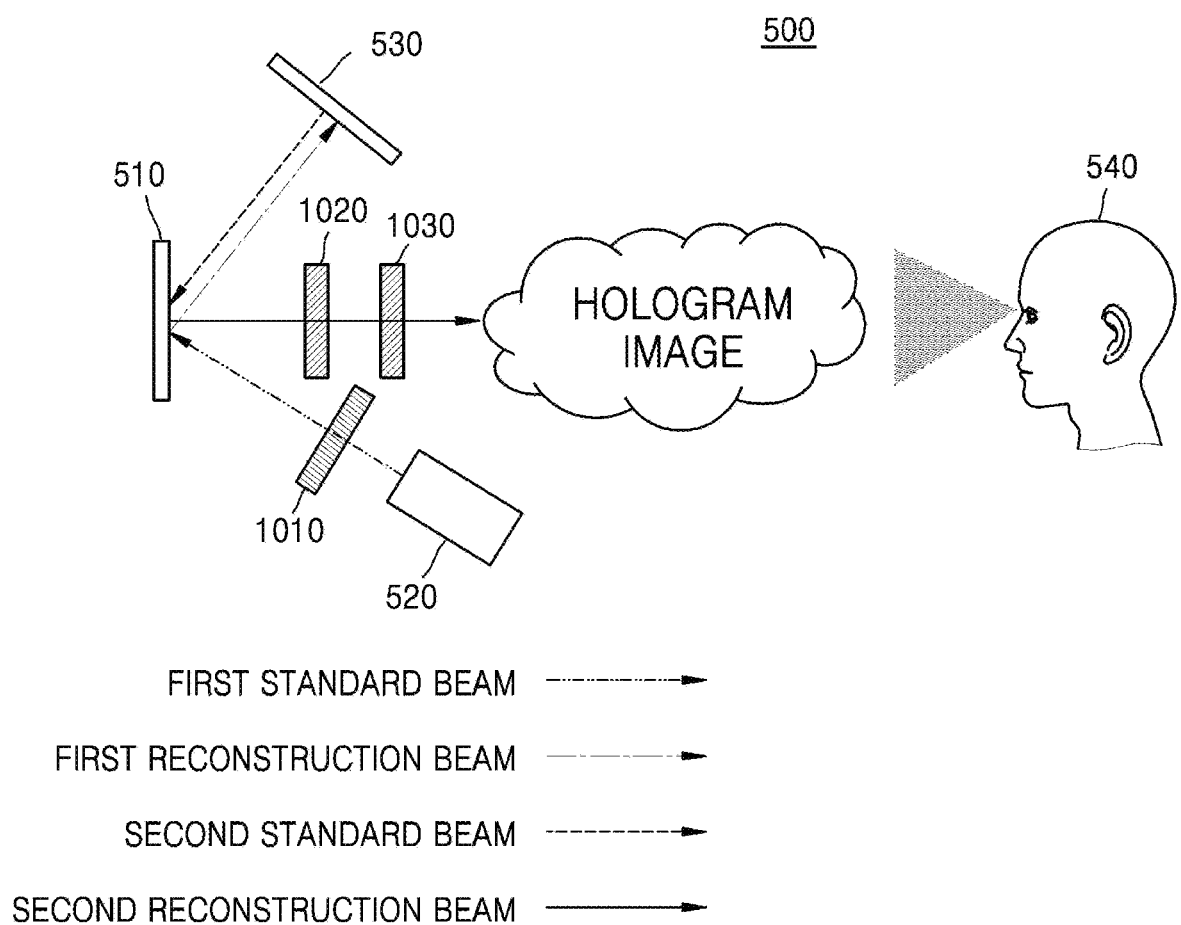
FIG. 10 schematically illustrates an apparatus for reconstructing a hologram, according to another embodiment.

FIG. 10 schematically illustrates an apparatus for reconstructing a hologram, according to another embodiment.

Referring to FIG. 10, the apparatus 500 for reconstructing a hologram according to the present embodiment may further include a first polarized panel 1010, a second polarized panel 1020, and a half bandpass filter 1030.

The first polarized panel 1010 and the second polarized panel 1020 may be arranged in front of and in the rear of the spatial light modulator 530 along an optical path in a perpendicular direction with each other, and thus the spatial light modulator 530 may be operated in an amplitude mode. In other words, the first polarized panel 1010 may be arranged on a path of the first reference beam, and the second polarized panel 1020 may be arranged on a path of the second reconstruction beam.

The half bandpass filter 1030 may be arranged on a Fourier plane, and may perform filtering on an undesired image and signal of the holographic image. For example, in FIG. 8, the half bandpass filter 1030 may filter and remove the conjugate term "g*(x,y)" and a direct current (DC) term "δ(x,y)".

FIGS. 11A, 11B, and 11C illustrate an example in which the apparatus for reconstructing a hologram displays a holographic image.

FIGS. 11A, 11B, and 11C are holographic images photographed by replacing the position of the observer 540 with a camera.

FIG. 11A shows an image photographed when the focus of a camera is located on a Fourier plane. FIG. 11B shows an image photographed when the focus of a camera is located on the holographic optical element. FIG. 11C shows an image photographed when the focus of a camera is located at a background object in the rear of the holographic optical element.

Figure 11:
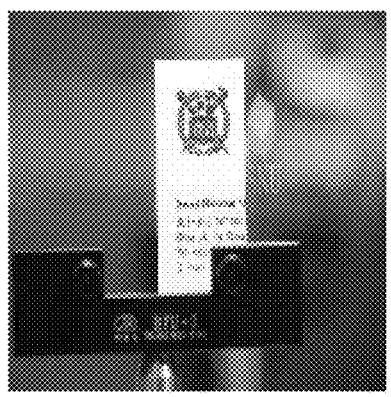
FIGS. 11A, 11B, and 11C illustrate an example in which the apparatus for reconstructing a hologram displays a holographic image.
Figure 11:
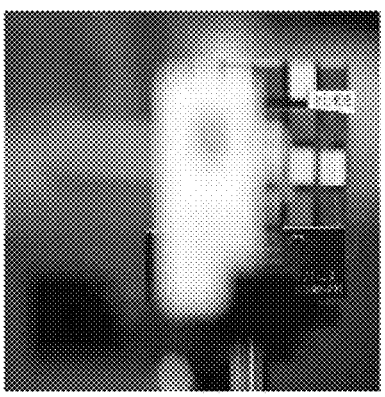
Figure 11:
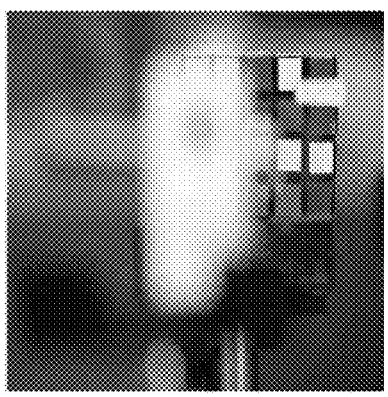

Accordingly, as illustrated in FIG. 11, the apparatus 500 for reconstructing a hologram according to the present embodiment may implement the optical see-through augmented reality, and thus, in view of an observer, not only a three-dimensional holographic image, but also the background object in the rear of the holographic optical element, may be observed without distortion.

As described above, the holographic optical element according to the present disclosure may implement the optical see-through augmented reality and have the optical characteristics of the Fourier lens. The apparatus for reconstructing a hologram may reconstruct a three-dimensional holographic image by means of the holographic optical element. Also, in view of an observer, not only a three-dimensional holographic image, but also a background object located in the rear of the holographic optical element may be observed without distortion.

Furthermore, since the first interference pattern and the second interference pattern are recorded together in the holographic optical element according to the present disclosure, the holographic optical element may have different optical characteristics corresponding to the first interference pattern and the second interference pattern.

The apparatus for manufacturing a holographic optical element and apparatus for reconstructing a hologram according to the present disclosure is not limited to the configuration and the method of the embodiments described above, but the embodiments may be constructed by selectively combining all or a part of the embodiments to enable various modifications.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical."

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present inventive concept is not limited to the described order of the steps. The use of any and all examples, or language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the present inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An apparatus for manufacturing a holographic optical element having different optical characteristics, the apparatus comprising:
    a light emitting portion configured to sequentially emit a first laser beam and a second laser beam;
    a beam splitter configured to split the first laser beam into a first signal beam and a first reference beam, and split the second laser beam into a second signal beam and a second reference beam;
    a hologram recording medium;
    a first optical system configured to emit the first signal beam to one surface of the hologram recording medium and the first reference beam to another surface of the hologram recording medium, and to record a first interference pattern of the first signal beam and the first reference beam on the hologram recording medium; and
    a second optical system comprising a Fourier lens and configured to emit a second signal beam modulated by the Fourier lens to one surface of the hologram recording medium and a second reference beam to another surface of the hologram recording medium, and to record a second interference pattern of the modulated second signal beam and the second reference beam on the hologram recording medium.

2. The apparatus of claim 1, wherein energy of the modulated second signal beam and the second reference beam emitted to the hologram recording medium during recording of the second interference pattern is set to be greater than energy of the first signal beam and the first reference beam emitted to the hologram recording medium during recording of the first interference pattern.

3. The apparatus of claim 1, wherein the light emitting portion emits the second laser beam longer than an emission time of the first laser beam.

4. The apparatus of claim 1, wherein the hologram recording medium, on which the first interference pattern and the second interference pattern are recorded, has optical characteristics of a mirror corresponding to the first interference pattern and optical characteristics of a Fourier lens corresponding to the second interference pattern.

\* \* \* \* \*